Figure 1:
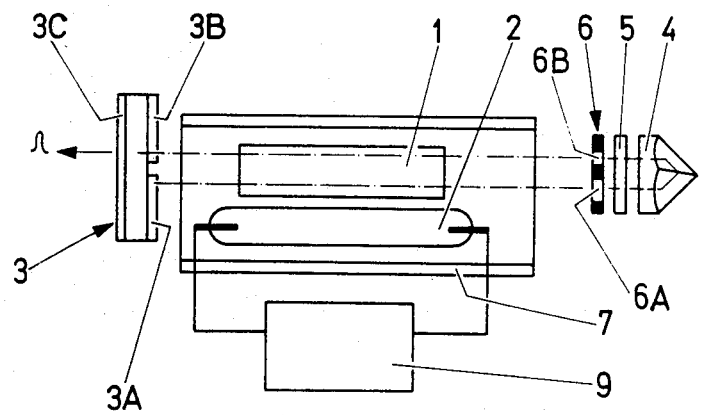

United States Patent [19]

Trošt et al.

[11] Patent Number: 4,672,616
[45] Date of Patent: Jun. 9, 1987

[54] SINGLE-MODE LASER

[75] Inventors: Stojan Trošt, Kranj; Boris Vedlin, Ljubljana; Marko Kazic, Tolmin, all of Yugoslavia

[73] Assignee: Iskra-Sozd elektrokovinske industrije n.sol.o., Ljubljana, Yugoslavia

[21] Appl. No.: 822,831

[22] Filed: Jan. 27, 1986

[30] Foreign Application Priority Data

Feb. 4, 1985 [YU] Yugoslavia .............................. 159/85

[51] Int. Cl.$^4$ .............................................. H01S 3/098
[52] U.S. Cl. ...................................... 372/19; 372/103; 372/100; 372/93; 372/10; 372/108
[58] Field of Search ........................ 372/19, 98, 92, 10, 372/93, 99, 103, 100, 108

[56] References Cited

U.S. PATENT DOCUMENTS

| | | | |
|---|---|---|---|
| 4,099,141 | 7/1978 | Leblanc et al. | 372/93 |
| 4,191,931 | 3/1980 | Kuppenheimer | 372/11 |
| 4,564,949 | 1/1986 | Trolinger | 372/93 |

FOREIGN PATENT DOCUMENTS 2804046  8/1889  Fed. Rep. of Germany ...... 372/107

Primary Examiner—Leon Scott, Jr.
Attorney, Agent, or Firm—Fleit, Jacobson, Cohn & Price

[57] ABSTRACT

The invention relates to a single-mode laser provided with a folded optical resonator, comprising a laser rod 1, resonator mirrors 3A, 3B deposited by evaporation on a single mirror plate 3, a stop 6 provided with two separate apertures 6A, 6B which are overlapped by the laser rod 1 when they are viewed along it and which are located so that the rays traversing the aperture 6A or 6B towards the resonator mirrors 3A, 3B, respectively, completely impinge only on the high reflecting resonator mirror 3A or on the semitransparent resonator mirror 3B, a foil Q-switch 5 and a reversing prism 4.

The device according to the invention is compact, of moderate price and is provided with a dynamically stable optical resonator, it generating single-mode laser pulses with a divergence below 2 mrad, but with an energy about 15 mJ and with a width about 10 nsec.

The device according to the invention is intended for use e.g. in ophthalmology or elsewhere where the laser pulses characterized above are required.

3 Claims, 4 Drawing Figures

SINGLE-MODE LASER

Present invention relates to lasers and in particular to ophthalmic laser systems.

Object of the invention is a single-mode laser in which a stop provided with two separate apertures is placed into the optical resonator in such manner that the apertures are located in front of one end face of a laser rod. The energy and the divergence of a single-mode output pulse generated by the laser according to the invention are comparable to the output pulse originating from several times larger lasers belonging to the prior art. The laser device proposed by the invention is dynamically stable. Ihe invention is generally applicable in lasers. The single-mode laser according to the invention is intended to be used e.g. in ophthalmology where in a combination with a slit lamp it is used in surgical operations, or elsewhere where a compact laser device with set demands on laser pulse quality is required. The problem solved by the present invention lies in providing a laser which should be as compact and of as moderate price as possible and which should have a dynamically stable optical resonator and the divergence of the singlemode laser pulse generated by it should not exceed 2 mrad, but on the other hand the laser output pulses should have an energy about 15 mJ and a pulse width about 10 nsec.

In the published patent application DE-OS No. 28 04 046 a laser provided with a folded optical resonator is described, in which resonator mirrors are mounted on a common holder. Thereby a dynamic stability of the optical resonator is intended to be increased. Disadvantageously, in this laser rays traverse the laser rod in only one branch of their path inside the optical resonator, while the path of the rays in the second branch of the optical resonator is not exploited for an amplification of the laser ray. As another disadvantage displayed in said laser the fact may be considered that an optical wedge is required to compensate wedge errors inherent to individual optical components which are traversed by rays, especially to both resonator mirrors.

The above technical problem is solved by a single-mode laser, characterized in that the stop in the optical resonator is provided with two separate apertures which are overlapped by the laser rod when they are viewed along it, and that the mirror plate surface turned to the interior of the optical resonator is partly prepared as a high reflecting resonator mirror and partly as a semitransparent resonator mirror, and that said stop is placed so that the rays traversing any of its apertures towards the resonator mirror completely strike only one of the resonator mirrors each time.

Figure 2:
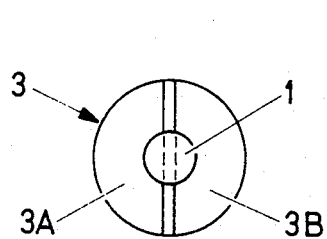
Figure 3:
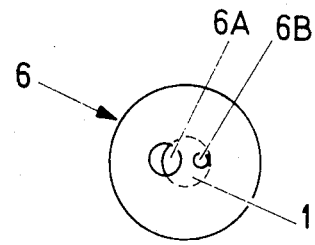
Figure 4:
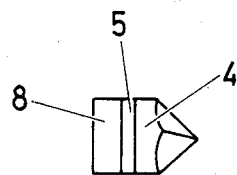

The invention will now be described by way of an example with reference to the accompanying drawing. Therein show:

FIG. 1 a set-up of the single-mode laser;
FIG. 2 a view along the laser rod on the laser rod and on the mirror plate;
FIG. 3 a view along the laser rod on the stop and on the laser rod;
FIG. 4 an assembly of a foil Q-switch and of a reversing prism.

The single-mode laser according to the invention shown in FIG. 1 is provided with a folded optical resonator. A ray therein and an output laser pulse are represented by a dash-and-dot line.

A high reflecting resonator mirror 3A and a semitransparent resonator mirror 3B are plane mirrors. They are deposited by evaporation on a plane surface of the glass mirror plate 3 so that they are separated from each other by an uncoated strip, which is narrow with respect to the transverse dimensions of the laser rod 1. The mirror plate 3 is with its mirrored face turned to the interior of the optical resonator. The second surface of the mirror plate 3, however, is provided with an antireflection coating 3C.

Face to face with the mirror plate 3 is located a reversing prism 4, being either a pyramid or a cover prism.

The laser rod 1 of round or rectangular cross-section is placed between the mirror plate 3 and the reversing prism 4 with its longitudinal axis perpendicular to the mirror plate 3 and with parts of both resonator mirrors 3A, 3B lying behind it (FIG. 2). The mirrored surface of the mirror plate 3 is adjusted in parallel to the near end face of the laser rod 1 in order to eliminate the wedge error. In the embodiment of the laser according to the present invention the laser rod 1 is an Nd-YAG rod representing, however, only one of the applicable lasing media.

The stop 6 is either inserted between the laser rod 1 and the reversing prism 4 or between the laser rod 1 and the mirror plate 3. The stop 6 is provided with two separate apertures 6A, 6B. The smaller of both apertures 6A, 6B is circular. The stop 6 is located so that the rays traversing the aperture 6A or the aperture 6B towards the resonator mirrors 3A, 3B each time completely impinge only on the high reflecting resonator mirror 3A or on the semitransparent resonator mirror 3B, respectively. The rays passing the edge of apertures 6A, 6B perpendicularly to the mirrored surface of the mirror plate 3 enclose two lasing volumes in the laser rod 1. The location of the stop 6 is further determined so that all rays traversing the smaller of both apertures 6A, 6B immediately, or after they have been reflected from the reversing prism 4, traverse the laser rod 1 as well (FIG. 3). The reversing prism 4 is with respect to apertures 6A, 6B located in such manner that all rays are reflected from the central portions of the reflecting faces of the reversing prism 4, i.e. they do not strike the prism edges.

The foil Q-switch 5 is placed next to the reversing prism 4. Preferably the reversing prism 4 is glued to one face of the foil Q-switch 5, a slab glass 8 being glued to the other face (FIG. 4).

A light flash from a flash tube 2 fed by a power supply 9 is collected by a reflector 7 and is directed to the laser rod 1.

A single-mode operation of the laser according to the invention is accomplished by making the smaller of the apertures 6A, 6B small enough to suppress higher modes. Typically, the diameter of the circular aperture is about 2 mm.

Above all the advantages of the device according to the invention with respect to the prior art devices lie in the generation of high energy single-mode laser pulse. An energy reduction of the laser pulse due to a diameter reduction of the smaller aperture in order to provide a single-mode pulse is compensated for in such manner that in both resonator branches a radiation traverses the laser rod 1. Another advantage of the device according to the invention lies in its dynamic stability accomplished by the optical resonator in which said radiation traverses the same laser rod 1 in both resonator branches whereby unpleasant effects of a bending of the laser rod 1, e.g. at fixing thereof or at temperature variations, are reduced.

What is claimed is:

1. A single-mode laser comprising: a laser (1) disposed in a folded optical resonator cavity provided with resonator mirrors (3A, 3B) at one end of said cavity; a reversing prism (4) in optical alignment with said resonator mirrors and a slab stop disposed at the other end of said caivty; a foil Q-switch (5) located between and in optical alignment with said prism and said stop; a flash tube (2) used to pump said laser rod; a reflector (7) which collects light from said flash tube and directs said light to said laser rod; a power supply (9); said stop (6) being provided with two separate apertures (6A,6B) one being smaller in diameter than the other and placed next to said one end face of the laser rod (1) so that said apertures (6A,6B) are overlapped by the laser rod (1) when viewed along the longitudinal axis of said rod; a mirror plate (3) having the two resonator mirrors (3A,3B) disposed thereon with the surfaces of both said mirrors turned to the interior of the optical resonator, one of said mirrors acting as a high reflecting resonator mirror (3A) and the other of said mirrors acting as a semitransparent resonator mirror (3B), the smaller of said apertures suppressing higher optical resonator modes thereby producing a single mode laser.

2. A device as claimed in claim 1, characterized in that the aperture (6A) or/and aperture (6B) is circular.

3. A device as claimed in claim 1, characterized in that the reversing prism (4) is glued to one face of the foil Q-switch (5) and the slab glass (8) is glued to its other face.

* * * * *